United States Patent [19]

Nyström et al.

[11] Patent Number: 5,149,442
[45] Date of Patent: Sep. 22, 1992

[54] REDUCTION OF HALOGENATED ORGANIC COMPOUNDS IN SPENT BLEACH LIQUOR

[75] Inventors: Mats G. Nyström, Ytterby; Kenneth O. Larsson; Anna K. Skogby, both of Göteborg; Solvie M. Herstad, Torslanda, all of Sweden

[73] Assignee: Eka Nobel AB, Bohus, Sweden

[21] Appl. No.: 689,503

[22] Filed: Apr. 23, 1991

[30] Foreign Application Priority Data

Apr. 23, 1990 [SE] Sweden ................. 9001481

[51] Int. Cl.$^5$ ............................. D21C 9/16
[52] U.S. Cl. .................... 210/724; 210/908; 210/917; 210/928; 210/759; 210/753; 210/754; 162/29; 162/301; 162/301.1
[58] Field of Search ........ 162/30.1, 30.11, 29, 162/31, 33; 210/724, 754, 758, 755, 753, 928, 908, 909, 917

[56] References Cited

U.S. PATENT DOCUMENTS

| | | | |
|---|---|---|---|
| 3,251,731 | 5/1966 | Gard | 162/71 |
| 3,865,685 | 2/1975 | Hebbel et al. | 162/78 |
| 4,222,819 | 9/1980 | Fossum et al. | 162/76 |
| 4,259,149 | 3/1981 | Jaszka et al. | 162/29 |
| 4,268,350 | 5/1981 | Månsson | 162/29 |
| 4,459,174 | 7/1984 | Papageorges et al. | 162/40 |
| 4,732,650 | 3/1988 | Michalowski et al. | 162/17 |
| 4,826,568 | 5/1989 | Gratzl | 162/76 |
| 4,874,521 | 10/1989 | Newman et al. | 210/919 |
| 4,946,556 | 8/1990 | Prough | 162/60 |

FOREIGN PATENT DOCUMENTS

| | | |
|---|---|---|
| 57944/86 | 12/1986 | Australia . |
| 14067/88 | 10/1988 | Australia . |
| 575636 | 5/1959 | Canada . |
| 946107 | 4/1974 | Canada . |
| 1080406 | 7/1980 | Canada . |
| 1206704 | 7/1986 | Canada . |
| 3620980 | 1/1988 | Fed. Rep. of Germany . |
| 903429 | 2/1982 | U.S.S.R. . |

OTHER PUBLICATIONS

Böttger, et al., "Dechlorination and Biological Treatment of Chorinated Organic Substances", Fourth International Symposium on Wood and Pulping Chemistry, Apr. 27-30, 1987, Paris, France, pp. 171-174.
Smeds, et al., "Formation and degradation of mutagens in kraft pulp mill water systems", Nordic Pulp and Paper Research Journal, No. 3, 1990, pp. 142-147.
J. Böttger et al, "Das Papier", vol. 40, 1986, No. 10A, pp. V25-33.
Gellerstedt et al, Journal of Wood Chemistry and Technology, vol. 2, No. 3, pp. 231-250, 1982.
R. D. Spitz, Tappi Journal, vol. 44, No. 10, pp. 731-734 (1961).
C-J. Alfthan et al, Svensk Papperstidning (Swedish Paper Journal), No. 15, pp. 480-482 1977.
Fennel et al, Tappi, "Hydrogen Peroxide for Bleaching Kraft PUlp", vol. 51, No. 1, 1986.
Anderson et al, Tappi, vol. 63, No. 4, pp. 111-115, 1980.

*Primary Examiner*—Stanley S. silverman
*Assistant Examiner*—Neil M. McCarthy
*Attorney, Agent, or Firm*—Burns, Doane, Swecker & Mathis

[57] ABSTRACT

The present invention relates to a method of reducing the content of halogenated organic compounds in the spent bleach liquor from the bleaching of lignocellulose-containing material with compounds containing halogen, wherein the spent bleach liquor, in a stage where no essential delignification or bleaching of the pulp takes place, is maintained at a pH of from 2.5 up to about 10, and wherein the residence time and the temperature are selected such that the amount of dissolved halogenated organic substances in the spent bleach liquor is reduced by at least 30%.

21 Claims, No Drawings

REDUCTION OF HALOGENATED ORGANIC COMPOUNDS IN SPENT BLEACH LIQUOR

The present invention relates to a method of reducing the content of halogenated organic compounds in the spent bleach liquor from the bleaching of lignocellulose-containing material with compounds containing halogen, wherein the spent bleach liquor, in a stage where no essential delignification or bleaching of the pulp takes place, is maintained at a pH of from 2.5 up to about 10, and wherein the residence time and the temperature are selected such that the amount of dissolved halogenated organic substances in the spent bleach liquor is reduced by at least 30%.

BACKGROUND

In the production of chemical pulp of high brightness, wood chips are first cooked to separate the cellulose fibres. During the cooking, part of the lignin holding the fibres together is degraded and modified such that it can be removed by subsequent washing. However, in order to achieve sufficient brightness, more lignin must be removed, together with brightness impairing (chromophoric) groups. This is frequently effected by delignification with oxygen, followed by bleaching in several stages.

Bleaching of chemical pulps is mainly carried out with chlorine-containing bleaching agents, such as chlorine, chlorine dioxide and hypochlorite, and furthermore in intermediate extraction stages with alkali and, optionally, hydrogen peroxide and/or oxygen. The chlorine-containing substances react with the lignin and render it soluble, either in the same stage or in the subsequent alkaline extraction stage.

A conventional bleaching sequence for softwood treated in accordance with the sulphate process is (C+D) E$_1$ D E$_2$ D wherein
- (C+D)=addition of chlorine (C) and chlorine dioxide (D) in the same stage, simultaneously or sequentially
- D=chlorine dioxide stage
- E$_1$=alkaline extraction stage, optionally with addition of peroxide (EP) and/or oxygen (EPO and EO, respectively)
- E$_2$=alkaline extraction stage, optionally with addition of peroxide (EP)

The (C+D) and E$_1$ stage is defined as a prebleaching stage. The sequence D E$_2$ D is called final bleaching. The above-mentioned oxygen delignification is normally regarded as part of the cooking process.

The reaction products formed in the bleaching stages using halogen-containing chemicals, give rise to discharges containing, inter alia halogenated organic compounds. These compounds can be measured, inter alia as AOX (=adsorbable organic halogen). When using chlorine dioxide, the AOX formation is but a fifth of that obtained with molecular chlorine. With increasingly stringent environmental standards, the proportion of chlorine dioxide has therefore been increased in the last few years. Thus, it is becoming more and more common to increase the proportion of chlorine dioxide in the (C+D) stage, and it will not be long before a pure D stage, frequently termed D$_0$, is used instead. To be able to compare the bleaching effect of the chlorine-containing substances, the amount of active chlorine is indicated, which is the oxidation potential multiplied by the amount of chlorine in the molecule, 1 kg chlorine dioxide corresponding to 2.63 kg active chlorine.

The cooking can be modified in several ways to further reduce the kappa number, before commencing the bleaching with chlorine-containing chemicals. In spite of these measures, the even more stringent restrictions which future environmental standards may be expected to impose on discharges will make it necessary to continue the processing of the effluents arisen. In the future, however, the water discharged into the receiving body of water must have an AOX content far lower than today. The method according to the present invention makes this practically feasible.

Today's biological techniques have primarily been developed to reduce the discharges of BOD (=biological oxygen demand), whereas e.g. the high-molecular fraction of AOX is not affected to any appreciable extent. The most common external biological purification techniques are the aerated lagoon and the activated sludge tank. In the aerated lagoon, the residence time is about 1-7 days, and the AOX reduction is limited to about 25-30%. This applies also to the COD content (=chemical oxygen demand). The waste water is conducted through an activated sludge tank in 12-24 hours, the AOX content being reduced by 40% or more, and the COD content by 40-60%. Present research is aimed also at developing biological techniques capable of degrading AOX molecules of high molecular weight. However, the future of these techniques is uncertain, inter alia because the types of fungi employed are difficult to separate intact.

Another technique that has been investigated is ultrafiltration which is most efficient in the processing of spent bleach liquor containing larger molecules. Such spent bleach liquor is obtained, inter alia from the first extraction stage.

According to a paper published by Böttger et al in "Das Papier", Vol. 40, 1986, No. 10A, pp V25-33, chlorine-bleached spruce and birch sulphite pulp is treated by an alkaline-thermal method for degrading chlorinated lignin compounds. The method was used on spent bleach liquor from the chlorine stage, and the AOX value before and after the treatment was determined. The results show that treatment at a pH of between 10.5 and 11.2, a temperature of between 60° and 70° C., and a residence time of 2 h, makes it possible to reduce the AOX content in the spent bleach liquor by a maximum of 54%. Such a high pH is undesirable for process reasons, and frequently impossible to obtain. Besides, the addition of sodium hydroxide means that the method is uneconomic, a fact also pointed out by the authors. Furthermore, the method has been applied to AOX formed in the bleaching of sulphite pulp. Normally, sulphite pulp is more easily bleached than sulphate pulp, which indicates that differences may exist between AOX formed when bleaching sulphite pulp and sulphate pulp, respectively.

DE 3,620,980 discloses a method of treating chlorinated organic compounds in the spent bleach liquor from an initial chlorine or chlorine-containing stage in a bleach plant for sulphite pulp. The process comprises three stages, the first stage involving increasing pH from 1.4 to about 6.2 and the simultaneous addition of calcium ions to facilitate precipitation. After the pH has been further increased to 10-12, the AOX content is reduced by precipitation of calcium salts. The second stage involves treating the filtered-off alkaline water at 40°-70° C. for 1-3 h. The final stage involves a microbial, biochemical treatment. It appears from the patent that a pH of about 11.5 is necessary in the second stage, which makes this technique expensive.

THE INVENTION

It has now been found that, by using the pH values existing in the bleach plant, it is still possible to reduce the content of dissolved AOX by at least the same amount as with prior art technique. Thus, near neutral solutions can be maintained for a short time at temperatures above 80° C. or, for a long period of time, at temperatures from about 40° C. In addition, the pH of the spent bleach liquor need not be adjusted appreciably after the treatment, before it is discharged into the receiving body of water.

The present invention thus relates to a treatment technique by which the discharge of AOX from bleach plants using halogen-containing chemicals can be greatly reduced. The treatment means that spent bleach liquor is conducted and maintained for such a long time that a thermal treatment at a pH between 2.5 and about 10 will degrade a substantial part of the halogenated organic compounds occurring in the spent bleach liquor before the treatment is commenced. The treatment can be reinforced with peroxide.

Thus, the present invention relates to a method for treating spent bleach liquor from the bleaching of lignocellulose-containing pulp with halogen-containing chemicals as disclosed in the appended claims. The invention relates to a method in the purification of spent bleach liquor, wherein the combination of pH, temperature, residence time and, optionally, the charging of peroxide jointly gives the desired reduction of AOX in the water supplied to the receiving body of water. The main difference compared to prior art technique is that the treatment is carried out at a pH lower than previously used. Although a near neutral pH is used, the content of AOX dissolved in the spent bleach liquor can be reduced by 60-80%, without extensive investments, in particular when the bleached pulp has been delignified by the sulphate process, which is a considerable improvement on present-day technique. The AOX content after the treatment is influenced by the pH, treatment time and temperature, but naturally also by the type and content of AOX formed during the bleaching.

Halogen-containing bleaching chemicals comprise chlorine-containing compounds, such as chlorine, chlorine dioxide, chlorite of alkali metals or alkaline earth metals and hypochlorite of alkali metals or alkaline earth metals, but also compounds of fluorine, bromine and iodine may be used. Halogenated organic substances relate to organic molecules from the wood and/or reaction products from the wood, where halogen has been incorporated in the molecule during treatment with halogen-containing bleaching chemicals. Examples of such organic substances are cellulose, hemicellulose, extractive matter and aromatic and aliphatic lignin residues. Examples of halogenated organic substances are chlorinated lignin residues, where the aromatic compounds in particular are sparingly degradable.

It is known that the largest amounts of halogenated organic compounds are formed in the (C +D) and E stages of the prebleaching. For example, a DO stage contains about 70-90% of the AOX formed during the entire bleaching sequence. Therefore, the largest absolute reduction of AOX is obtainable by treating the spent bleach liquor from the prebleaching. The method of the present invention is particularly effective in the treatment of the spent bleach liquor from the first halogen-containing stage. Therefore, it is preferred to treat spent bleach liquor from the prebleaching stages using halogen-containing bleaching chemicals. Especially preferred is the treatment of spent bleach liquor only from prebleaching stages in which the halogen-containing bleaching chemical consists of technical chlorine dioxide.

The treatment according to the invention is applicable to the spent bleach liquor from a bleaching stage containing as little as 15% chlorine dioxide, calculated as active chlorine, the remaining active chlorine consisting of molecular chlorine (C+D). Suitably, the spent bleach liquor treated originates from stages containing from 50% chlorine dioxide, calculated as active chlorine. Especially good results in respect of AOX reduction are obtained when treating AOX-containing spent bleach liquors from bleaching stages using technical chlorine dioxide only. It has been found that the chlorinated products obtained by chlorine dioxide bleaching are degraded to a considerable extent by the treatment according to the invention. Thus, the treatment of spent bleach liquor from a stage using technical chlorine dioxide only is preferred. Technical chlorine dioxide relates to chlorine dioxide produced by conventional methods without external addition of chlorine. The chlorine dioxide may thus contain chlorine formed during the production and dissolved in the absorption water. One example of industrial processes in which substantial amounts of chlorine are formed, is the reduction of chlorate with chloride. Other chlorate-reducing agents, such as sulphur dioxide and methanol, give but minor amounts of chlorine. Chlorine dioxide water from such essentially chlorine-free processes, preferably less than 0.5 g chlorine/liter, is especially preferred.

The method is applicable also to the spent bleach liquor from alkaline extraction stages (E), optionally reinforced with hydrogen peroxide (EP) and/or oxygen (EPO and EO, respectively). The treatment can be carried out after the spent bleach liquors from several stages have been combined to form a mixed effluent. Preferably, the spent bleach liquors are combined such that the resulting pH will be near neutral, whereby chemicals for neutralizing treated spent bleach liquor may be wholly or partly excluded. Thus, the spent bleach liquor from a (C+D) stage or a pure $D_0$ stage may be combined to form a mixed effluent with the spent bleach liquor from an E stage, optionally reinforced to an EO or EPO stage. Thus, it is preferred to mix spent bleach liquor from the $D_0$ and $E_1$ stages, whereby the content of AOX will be especially low, both before and after the treatment. Separate treatment is, of course, also possible.

Also spent bleach liquors from the final bleaching can be treated separately, jointly, or in combination with the spent bleach liquors from the prebleaching.

In the method according to the invention, the spent bleach liquor is treated in stages wherein no essential bleaching of the pulp takes place. This means that the treatment must be carried out in apparatus outside the actual bleaching stages, i.e. stages wherein the pulp is treated with chemicals in order to reduce its lignin content, or to bleach the pulp.

The spent bleach liquor preferably contains up to about 2% by weight of fibres and other solid matter, i.e. fibre-containing spent bleach liquors outside actual bleaching towers. Preferably, spent bleach liquor is treated which contains up to 1% by weight of solid matter. Especially preferred is the treatment of spent bleach liquor containing up to 0.5% by weight of fibres and other solid matter.

In the method according to the invention, the spent bleach liquor is treated at a temperature of from about 40 to about 140° C., suitably from 50° to 120° C. and preferably from 60° to 100° C. Especially preferred is a treatment at from 70° to 100° C. The residence time may lie within the range of from 1 min up to 72 h, suitably from 5 min to 24 h, preferably from 5 to 360 min. Especially preferred is a residence time within the range of from 15 to 120 min. The pH at the beginning of the treatment may lie within the range of from 2.5 up to about 10, suitably from 3.5 up to 9, and preferably from 5 up to 9.

The treatment may be reinforced by adding a peroxide-containing substance, directly or after a given pretreatment time. The peroxide-containing substance is preferably hydrogen peroxide and/or peroxide-containing spent bleach liquor, but also other inorganic peroxides, such as sodium peroxide, and organic peroxides, such as peracetic acid, are suitable. Furthermore, it has been found suitable to use peroxide when the residence times are longer. Thus, peroxide is suitable when the residence time is from 30 min, preferably from 60 min. The time for addition of hydrogen peroxide appears to be of little consequence. Thus, the addition may take place whenever this is propitious to the process technology.

Furthermore, it has been found suitable to add peroxide in the treatment of spent bleach liquor from a (C+D) stage containing from 15% chlorine dioxide, calculated as active chlorine, preferably from 50%, calculated as active chlorine. Especially preferred is the addition of hydrogen peroxide when the (C+D) stage comprises technical chlorine dioxide. The amount of peroxide charged may be from about 0.5 to about 10.0 kg peroxide, calculated as 100% hydrogen peroxide per ton of dry pulp. Suitably from 1.0 to 8.0 kg peroxide per ton of dry pulp is charged. The preferred charge is from 2.0 to 6.0 kg peroxide, calculated as 100% hydrogen peroxide per ton of dry pulp.

Treatment according to the invention takes place at a pH of from 2. up to about 10, which preferably is achieved without the addition of chemicals. The AOX reduction is determined primarily by the pH of the spent bleach liquor, and by the time and temperature of the treatment. Any exact values are not readily set up, but can be established by anyone skilled in the art by simple experiments and, preferably, by combining the thermal energy and pH in the spent bleach liquor flows of a bleach plant, the treatment time being selected with due regard to the existing equipment, such as bleaching towers, washers, settling basins, storage tanks, etc. It is, of course, also within the scope of the present invention that existing flows can be supplemented with further alkalization or heating. Generally, the temperature as well as the pH selected should be as high as possible so that the desired AOX reduction can be obtained in the shortest time possible. However, it is also possible to utilize the effect according to the invention at lower temperatures and lower pH, provided that the volume of the treatment equipment is sufficient. For example, existing settling basins may be used, if they are heat-insulated so that the water is cooled so slowly that a considerable AOX reduction is obtained. The essential feature of the invention is that the given combination of pH, time and temperature is carried out in a stage where no essential delignification or bleaching of the pulp takes place, such that the amount of AOX dissolved in the spent bleach liquor is reduced by at least 30%, suitably at least 40%, and preferably at least 50%. A reduction by at least 60% is especially preferred. Depending on the above-mentioned factors, it is also possible to achieve a reduction of more than 70%. In particular, the treatment according to the invention can be carried out in different treatment stages before the bleaching, for example in pre-washers, or where complexing agents are charged.

Furthermore, measures are about to be taken to increase the pulp concentration during bleaching, inter alia in the first stage (C+D or $D_0$), which will result in a reduction of the spent bleach liquor volumes, and this again will reduce the cost of maintaining a high treatment temperature and a long residence time.

As an example of suitable ranges, it can be stated that at an initial pH of at least 6 an AOX reduction of 50% is obtained within 15–120 min at a temperature of 100°–60° C. Table VIII shows suitable time and temperature combinations if, for example, a 60% reduction of AOX from the bleaching of a sulphate pulp in a mixed effluent with an initial pH of 6.2, is desired. Table VIII serves to illustrate the invention, but without restricting it. It is especially preferred to maintain the spent bleach liquor for at least 10 min at a pH of from 5 to 10 and at a temperature within the range of from 60° C. to 100° C.

Lignocellulose-containing material refer to chemical pulps from softwood and/or hardwood delignified according to the sulphite, sulphate, soda or organosolv process, or modifications and/or combinations thereof. The method according to the invention can be used for such bleaching of the treated pulp, where the bleaching sequence is preceded by delignification in an oxygen stage. To the extent that mechanical pulps are subjected to bleaching with halogen-containing chemicals, the invention is applicable also to the AOX-containing material resulting from such treatment.

Especially good results were obtained when the method according to the invention was applied to spent bleach liquor from the bleaching of pulps delignified by the sulphate process. It has been found that dissolved AOX in the spent bleach liquor from the bleaching of sulphate pulps is degraded under the mild conditions that a treatment within the pH range of the method according to the present invention means, unlike the treatment of spent bleach liquor from the bleaching of sulphite pulps where a far higher pH is required to give the required AOX reduction in a treatment according to the invention. This is completely surprising because, normally, sulphite pulps are considered to be more readily bleachable than sulphate pulps. It therefore is especially preferred to apply the method according to the invention to spent bleach liquor from the bleaching of pulps delignified according to the sulphate process.

Spent bleach liquor refers to the liquid flows which occur in a bleach plant and which have previously participated in the treatment of pulp, such as waters obtained from washing stages, bleaching stages, filters, presses, etc., or waste water from mixing vessels, settling apparatuses, etc.

The invention and its advantages are illustrated in more detail by the following Examples which merely serve to illustrate the invention, not to restrict it.

In the Examples, use is made of unbleached mill pulp that has been washed once with distilled water in the laboratory and then bleached in a bag in two stages, according to standard laboratory technique.

The content of halogenated organic substances, measured as AOX (=adsorbable organic halogens), was determined according to SCAN-W 9:89, the sample being acidified with nitric acid, and its organic constituents being adsorbed batchwise on active carbon. Inorganic chlorine-containing ions are displaced by nitrate ions. The carbon is burned with oxygen in a quartz tube at about 1000° C. The resulting hydrochloric acid is absorbed in an electrolyte solution and determined by microcoulometric titration.

Since the AOX content is given as kg of AOX/ton of pulp in official regulations, the experimental values have been converted by multiplying mg of AOX/liter of spent bleach liquor by liter of spent bleach liquor/ton of pulp.

EXAMPLE 1

The spent bleach liquor from the prebleaching of a sulphate pulp was treated at 100° C. during residence times of between 15 and 120 min and at an initial pH of from 3.0 to 9.0. The pulp was an oxygen-delignified sulphate mill pulp of softwood with kappa number 16.8 which, in a first stage, was bleached with technical chlorine dioxide ($D_0$) containing 0.02% chlorine, calculated as active chlorine, at a pulp concentration of 3.5% by weight. After an intermediate washing stage, the pulp was treated in an alkaline extraction stage (El) at a pulp concentration of 10% by weight. Spent bleach liquors from the washing stages after $D_0$ and $E_1$ were mixed proportionally to the liquid volumes of the respective stage, i.e. in a ratio of 3 $D_0$:1 $E_1$. The resulting pH was about 6. Where appropriate, pH was adjusted with 1 M $H_2SO_4$ or 1 M NaOH.

TABLE I

| pH | Time min | AOX in spent bleach liquor | | |
|---|---|---|---|---|
| | | content mg/l | reduction % | content kg/ton of pulp |
| 6.2 | — | 21.0 | — | 0.77 |
| 3.0 | 15 | 12.0 | 45.5 | 0.44 |
| 3.0 | 120 | 8.9 | 59.5 | 0.33 |
| 6.2 | 15 | 7.2 | 65.7 | 0.26 |
| 6.2 | 60 | 6.3 | 70.0 | 0.23 |
| 6.2 | 120 | 6.0 | 71.4 | 0.22 |
| 7.0 | 15 | 8.1 | 61.4 | 0.30 |
| 7.0 | 30 | 8.0 | 61.9 | 0.29 |
| 7.0 | 60 | 7.6 | 63.8 | 0.28 |
| 7.0 | 120 | 7.0 | 66.7 | 0.26 |
| 9.0 | 15 | 6.7 | 68.1 | 0.25 |
| 9.0 | 60 | 5.8 | 72.4 | 0.21 |
| 9.0 | 120 | 5.5 | 73.8 | 0.20 |
| 9.0* | 120 | 4.6 | 79.1 | 0.17 |

*Result at 120° C. Reference value 22.0 mg/l

As is apparent from the Table, the AOX reduction is at least 60% at pH≧6.2, if the treatment is carried out for at least 15 min. At lower pH, longer times are required. In absolute numbers, the results mean that it is possible, with the method according to the invention, to go below 0.3 kg of AOX/ton of pulp.

EXAMPLE 2

The spent bleach liquor from the prebleaching of a sulphate pulp was treated at an initial pH of 6.2 during residence times of between 15 min and 24 h and at temperatures of from 40° to 100° C. The pulp was the same as the one used in Example 1 and had been bleached in the same manner. The spent bleach liquors from $D_0$ and $E_1$ were mixed in accordance with Example 1, before the method according to the invention was carried out.

TABLE II

| Temperature °C. | Time min | AOX in spent bleach liquor | | |
|---|---|---|---|---|
| | | content mg/l | reduction % | content kg/ton of pulp |
| — | — | 18.5 | — | 0.68 |
| 40 | 6 h | 13.5 | 27 | 0.49 |
| 40 | 24 h | 9.1 | 50.8 | 0.33 |
| — | — | 21.0 | — | 0.77 |
| 60 | 15 | 13.5 | 38.6 | 0.49 |
| 60 | 120 | 11.0 | 50.0 | 0.40 |
| 80 | 20 | 8.8 | 60.0 | 0.32 |
| 80 | 60 | 7.7 | 65.0 | 0.28 |
| 80 | 120 | 6.8 | 69.1 | 0.25 |
| 100 | 15 | 7.2 | 65.7 | 0.26 |
| 100 | 60 | 6.3 | 70.0 | 0.23 |
| 100 | 120 | 6.0 | 71.4 | 0.22 |

As is apparent from the Table, a 60% reduction of AOX is obtained if the time is at least 20 min, even if the temperature is reduced to 80° C. Compare Example 1.

EXAMPLE 3

The spent bleach liquor from the prebleaching of a sulphate pulp was treated at an initial pH of 3.0 during residence times of between 15 min and 24 h and at temperatures of from 40° to 100° C. The pulp was the same as the one used in Example 1 and had been bleached in the same manner. The spent bleach liquors from $D_0$ and $E_1$ were mixed in accordance with Example 1, before the method according to the invention was carried out.

TABLE III

| Temperature °C. | Time min | AOX in spent bleach liquor | | |
|---|---|---|---|---|
| | | content mg/l | reduction % | content kg/ton of pulp |
| — | — | 22.0 | — | 0.80 |
| 40 | 24 h | 15.5 | 29.5 | 0.57 |
| 60 | 120 | 16.0 | 27.3 | 0.59 |
| — | — | 18.5 | — | |
| 60 | 6 h | 10.0 | 45.9 | 0.37 |
| 60 | 24 h | 8.7 | 53.0 | 0.32 |
| — | — | 22.0 | — | 0.80 |
| 80 | 20 | 11.5 | 47.7 | 0.42 |
| 80 | 120 | 8.1 | 63.2 | 0.30 |
| 100 | 15 | 12.0 | 45.5 | 0.44 |
| 100 | 120 | 8.9 | 59.5 | 0.33 |

As is apparent from the Table, a longer residence time and/or higher temperature is required at this pH in order to achieve the same AOX reduction as at pH 6.2 in the preceding Example.

EXAMPLE 4

Example 4 illustrates the treatment according to the invention, where AOX-containing spent bleach liquor from a (C+D) stage with a varying proportion of D has been mixed with AOX-containing spent bleach liquor from an E stage at 100° C. and an initial pH of 7.0. The proportion of chlorine dioxide is given as active chlorine. The pulp was the same sulphate pulp as the one used in Example 1 and had been bleached in the same manner.

TABLE IV

| Prop. of chlorine dioxide % active chlorine | Time min | AOX in spent bleach liquor | | |
|---|---|---|---|---|
| | | content mg/l | reduction % | content kg/ton of pulp |
| 100 | — | 21.0 | — | 0.77 |
| 100 | 15 | 8.1 | 61.4 | 0.30 |
| 100 | 30 | 8.0 | 61.9 | 0.29 |
| 100 | 60 | 7.6 | 63.8 | 0.28 |
| 100 | 120 | 7.0 | 66.7 | 0.26 |
| 70 | — | 30.0 | — | 1.10 |
| 70 | 60 | 16.6 | 44.7 | 0.61 |
| 70 | 120 | 15.8 | 47.3 | 0.58 |
| 15 | — | 75.0 | — | 2.74 |
| 15 | 60 | 43.0 | 42.7 | 1.57 |
| 15 | 120 | 39.0 | 48.0 | 1.43 |

As is apparent from the Table, a considerable reduction of the AOX content is achieved by this treatment. It also appears that a far greater proportion of AOX is degraded after the present treatment, if a very high proportion of chlorine dioxide is used in the (C+D) stage.

EXAMPLE 5

The spent bleach liquor from the prebleaching of a sulphate pulp was treated in accordance with the invention, with and without hydrogen peroxide, at 100° C. and an initial pH of 7.0, and during residence times of between 15 and 120 min. The pulp was an oxygen-delignified sulphate mill pulp of softwood which, in a first stage, was bleached with 15% technical chloride dioxide and 85% chlorine, the proportions being calculated as active chlorine. After an intermediate washing stage, the pulp was treated in an alkaline extraction stage ($E_1$). The spent bleach liquors from (C+D) and $E_1$ were mixed before the method according to the invention was carried out. 3 kg hydrogen peroxide/ton of pulp was charged directly and after 30 min, respectively.

TABLE V

| Time min | AOX in spent bleach liquor | | |
|---|---|---|---|
| | content g/l | reduction % | content kg/ton of pulp |
| *Reference* | | | |
| — | 75.0 | — | 2.74 |
| *Without hydrogen peroxide* | | | |
| 60 | 43.0 | 42.7 | 1.57 |
| 120 | 39.0 | 48.0 | 1.43 |
| *Hydrogen peroxide charged directly* | | | |
| 60 | 42.0 | 44.0 | 1.54 |
| 120 | 35.0 | 53.3 | 1.28 |
| *Hydrogen peroxide charged after 30 min* | | | |
| 60 | 41.0 | 45.3 | 1.50 |
| 120 | 36.0 | 52.0 | 1.32 |

As is apparent from the Table, the addition of hydrogen peroxide gives a reinforced degradation, especially at longer times.

EXAMPLE 6

The spent bleach liquor from the prebleaching of a sulphate pulp was treated in accordance with the invention, with and without hydrogen peroxide, at 100° C. and at an initial pH of 7.0, and during residence times of between 15 and 120 min. The pulp was an oxygen-delignified sulphate mill pulp of softwood which, in a first stage, was bleached with technical chlorine dioxide ($D_0$) containing 0.02% chlorine, calculated as active chlorine. After an intermediate washing stage, the pulp was treated in an alkaline extraction stage reinforced with hydrogen peroxide ($E_1$). The spent bleach liquors from $D_0$ and $E_1$ were mixed before the method according to the invention was carried out. 3 kg hydrogen peroxide/ton of pulp was charged directly and after 30 min, respectively.

TABLE VI

| Time min | AOX in spent bleach liquor | | |
|---|---|---|---|
| | content g/l | reduction % | content kg/ton of pulp |
| *Reference* | | | |
| — | 21.0 | — | 0.77 |
| *Without hydrogen peroxide* | | | |
| 15 | 8.1 | 61.43 | 0.30 |
| 30 | 8.0 | 61.9 | 0.29 |
| 60 | 7.6 | 63.8 | 0.28 |
| 120 | 7.0 | 66.7 | 0.26 |
| *Hydrogen peroxide charged directly* | | | |
| 15 | 7.7 | 63.3 | 0.28 |
| 30 | 6.7 | 68.1 | 0.25 |
| 60 | 5.6 | 73.3 | 0.20 |
| 120 | 5.2 | 75.2 | 0.19 |
| *Hydrogen peroxide charged after 30 min* | | | |
| 45 | 6.3 | 70.0 | 0.23 |
| 60 | 6.0 | 71.4 | 0.22 |
| 120 | 5.2 | 75.2 | 0.19 |

A comparison with Example 5, shows that the AOX content in both cases can be reduced by about 0.1 kg of AOX/ton of pulp. Naturally, the percentage reduction will be highest in the present Example since the contents are far lower.

EXAMPLE 7

Spent bleach liquors from the $D_0$ and the $E_1$ stages were treated in accordance with the invention at pH 2.9–3.0 and 100° C., both separately and after mixing proportionally to the liquid volumes. The sulphate pulp was the same as the one used in Example 1 and had been bleached in the same manner.

TABLE VII

| Time min | AOX in spent bleach liquor | | |
|---|---|---|---|
| | content g/l | reduction % | content kg/ton of pulp |
| *$D_0$* | | | |
| — | 26.0 | — | 0.72 |
| 15 | 13.0 | 50.0 | 0.36 |
| 120 | 6.7 | 74.2 | 0.18 |
| *$E_1$* | | | |
| — | 13.0 | — | 0.12 |
| 120 | 11.0 | 15.4 | 0.10 |
| *$D_0 + E_1$* | | | |
| — | 22.0 | — | 0.80 |
| 15 | 12.0 | 45.5 | 0.44 |
| 120 | 8.9 | 59.5 | 0.33 |

The comparison, shows that the treatment according to the present invention has its highest effect on AOX in the spent bleach liquor from the $D_0$ stage. The explanation may be that the temperature and pH in the $E_1$ stage are such that a large proportion of the incoming AOX is degraded during the alkaline extraction. The remaining AOX therefore is far more difficult to treat than the AOX in the spent bleach liquor from the normally cooler $D_0$ stage in which pH besides is far lower and therefore less favourable.

EXAMPLE 8

Table VIII is a compilation of different results obtained in the treatment of AOX-containing spent bleach liquor obtained by mixing spent bleach liquor from the bleaching of sulphate pulp with technical chlorine dioxide ($D_0$) and spent bleach liquor from a subsequent alkaline extraction ($E_1$).

TABLE VIII

| Temperature °C. | pH 3 | pH 6.2 | pH 9 |
|---|---|---|---|
| *AOX reduction 30%* | | | |
| 40 | 24 h | 9 h | 4 h |
| 60 | 3 h | 15 min | 15 min |
| 80 | ≦15 min | ≦15 min | ≦15 min |
| 100 | ≦15 min | ≦15 min | ≦15 min |
| *AOX reduction 40%* | | | |
| 40 | ≧24 h | 17 h | 7 h |
| 60 | 4 h | 20 min | 20 min |
| 80 | ≦15 min | ≦15 min | ≦15 min |
| 100 | ≦15 min | ≦15 min | ≦15 min |
| *AOX reduction 50%* | | | |
| 40 | ≧24 h | 24 h | 12 h |
| 60 | 20 h | 2 h | 1 h |
| 80 | 30 min | ≦15 min | ≦15 min |
| 100 | 30 min | ≦15 min | ≦15 min |
| *AOX reduction 60%* | | | |
| 40 | ≧24 h | ≧24 h | ≧24 h |
| 60 | ≧24 h | ≧8 h | 2 h |
| 80 | 2 h | 15 min | 15 min |
| 100 | 2 h | ≦15 min | ≦15 min |

As is apparent, the requisite residence time increases with a decrease in pH and temperature. If the desired AOX reduction is known, the requisite combination of pH, time and temperature can be estimated. In the same manner, the expected AOX reduction can be estimated if the existing conditions are known.

EXAMPLE 9

Spent bleach liquors from the prebleaching of different sulphate mill pulps were treated at an initial pH of 6.2 for 15 and 120 min, at 60° and 100° C. The sulphate pulps were an oxygen-delignified softwood pulp of kappa number 16.8 (SaO softwood), a non-oxygen-delignified softwood pulp of kappa number 28.1 (Sa softwood), and an oxygen-delignified hardwood pulp of kappa number 11.3 (SaO hardwood). The pulps were bleached in a first stage with technical chlorine dioxide ($D_0$) containing 0.02% chlorine, calculated as active chlorine, at a pulp concentration of 3.5% by weight. After an intermediate washing stage, the pulp was treated in an alkaline extraction stage ($E_1$) at a pulp concentration of 10% by weight. Spent bleach liquor from the washing stages after $D_0$ and $E_1$ were mixed proportionally to the liquid volumes of the respective stage, i.e. in the ratio 3 $D_0$:1 $E_1$. The resulting pH was about 6. Where appropriate, pH was adjusted with 1 M $H_2SO_4$ or 1 M NaOH.

TABLE IX

| Pulp type | Time min | AOX in spent bleach liquor content mg/l | reduction % | content kg/ton of pulp |
|---|---|---|---|---|
| *60° C.* | | | | |
| SaO softwood | — | 21 | — | 0.77 |
| SaO softwood | 15 | 13.5 | 38.60 | 0.49 |
| SaO softwood | 120 | 11.0 | 50.00 | 0.40 |
| SaO softwood | — | 46 | — | 1.68 |
| SaO softwood | 120 | 28 | 39.1 | 1.02 |
| SaO hardwood | — | 15.5 | — | 0.57 |
| SaO hardwood | 120 | 7.6 | 51.0 | 0.28 |
| *100° C.* | | | | |
| SaO softwood | — | 21 | — | 0.77 |
| SaO softwood | 15 | 7.2 | 65.7 | 0.26 |
| SaO softwood | 120 | 6.0 | 71.4 | 0.22 |
| SaO softwood | — | 46 | — | 1.68 |
| SaO softwood | 15 | 22 | 52.2 | 0.80 |
| SaO softwood | 120 | 19 | 58.7 | 0.69 |
| SaO hardwood | — | 15.5 | — | 0.57 |
| SaO hardwood | 15 | 5.9 | 61.9 | 0.22 |
| SaO hardwood | 120 | 4.5 | 71.0 | 0.16 |

As is apparent from the Table, the treatment according to the invention gives a satisfactory reduction of dissolved AOX from the prebleaching of sulphate pulps of both softwood and hardwood, with and without oxygen delignification.

EXAMPLE 10

Spent bleach liquor from the bleaching of softwood delignified according to the sulphate process has been treated at 80° C. according to the invention. The kappa number before bleaching was 13.1. The spent bleach liquor from the washing stages after the (C+D) or $D_0$ stage and the $E_1$ stage were mixed proportionally to the liquid volumes of the respective stage. The resulting pH was about 6. Where appropriate, pH was adjusted with 1 M $H_2SO_4$ or 1 M NaOH.

TABLE X

| pH | Time min | AOX in spent bleach liquor content mg/l | reduction % | content kg/ton of pulp |
|---|---|---|---|---|
| *15% D + 85% C* | | | | |
| — | — | 101 | — | 3.69 |
| 6.2 | 15 | 92.0 | 8.9 | 3.36 |
| 6.2 | 120 | 84.0 | 16.8 | 3.07 |
| *100% D* | | | | |
| — | — | 19.5 | — | 0.71 |
| 6.2 | 15 | 18.5 | 5.1 | 0.68 |
| 6.2 | 120 | 15.0 | 23.1 | 0.55 |
| 9.0 | 15 | 15.8 | 19.0 | 0.58 |
| 9.0 | 120 | 13.3 | 31.8 | 0.49 |

As is apparent, a comparison with the results at 80° C. in Table II, the treatment according to the invention gives a substantially larger AOX reduction with spent bleach liquor from the bleaching of sulphate pulp than with spent bleach liquor from the bleaching of sulphite pulp.

We claim:

1. A method of reducing the amount of discharged halogenated organic substance in spent bleach liquor obtained from delignification and bleaching of lignocellulose-containing pulp with halogen-containing compounds, comprising maintaining the spent bleach liquor at a pH of from about 2.5 to about 10, in a processing stage wherein substantially no delignification or bleaching of the pulp occurs, and at a temperature and for a residence time sufficient to reduce the amount of halogenated organic substance by at least about 30% by weight.

2. A method according to claim 1, wherein the amount of halogenated organic substance is reduced by at least about 40% by weight.

3. A method according to claim 1, wherein the amount of halogenated organic substance is reduced by at least about 50% by weight.

4. A method according to claim 1, wherein the amount of halogenated organic substance is reduced by at least about 60% by weight.

5. A method according to claim 1, wherein the spent bleach liquor contains up to about 2% by weight of fibers and other solid matter.

6. A method according to claim 1, wherein the lignocellulose-containing material is a pulp delignified according to the sulphate process.

7. A method according to claim 1, wherein the temperature of the spent bleach liquor in the processing stage is from about 40° to about 140° C.

8. A method according to claim 7, wherein the temperature of the spent bleach liquor in the processing stage is from about 50° to about 120° C.

9. A method according to claim 8, wherein the temperature of the spent bleach liquor in the processing stage is from about 60° to about 100° C.

10. A method according to claim 1, wherein the pH of the spent bleach liquor in the processing stage is between about 3.5 and about 9.

11. A method according to claim 10, wherein the pH is from about 5 to about 9.

12. A method according to claim 11, wherein the residence time of the spent bleach liquor in the processing stage is between about 1 minute and about 72 hours.

13. A method according to claim 12, wherein the residence time of the spent bleach liquor in the processing stage is between about 5 minutes and about 24 hours.

14. A method according to claim 13, wherein the residence time in the processing stage is between about 5 minutes and about 360 minutes.

15. A method according to claim 11, wherein the spent bleach liquor has a pH of from about 5 to about 10 and is treated for at least about 10 minutes at a temperature within the range of from about 60° to about 100° C.

16. A method according to claim 1, wherein the spent bleach liquor is obtained during prebleaching with a halogen-containing bleaching chemical.

17. A method according to claim 1, wherein the spent bleach liquor is obtained from a mixture of the spent bleach liquor from the prebleaching with chlorine dioxide and/or chlorine and the spent bleach liquor from an alkaline extraction stage.

18. A method according to claim 1, wherein hydrogen peroxide is present in the treatment stage.

19. A method according to claim 1, wherein the bleaching chemicals containing halogen are chlorine dioxide and/or chlorine.

20. A method according to claim 19, wherein the proportion of chlorine dioxide in the halogen chemical-containing stage is at least about 50% by weight, calculated as active chlorine.

21. A method according to claim 19, wherein the bleaching chemicals containing halogen include technical chlorine dioxide.

* * * * *

UNITED STATES PATENT AND TRADEMARK OFFICE
CERTIFICATE OF CORRECTION

PATENT NO. : 5,149,442
DATED : September 22, 1992
INVENTOR(S) : Mats G. NYSTRÖM et al It is certified that error appears in the above-identified patent and that said Letters Patent is hereby corrected as shown below:

Column 13, line 1 of Claim 12, "11" should read --1--.

Column 14, line 1 of Claim 15, "11" should read --1--.

Signed and Sealed this

Twenty-third Day of November, 1993

Attest:

BRUCE LEHMAN

*Attesting Officer*      Commissioner of Patents and Trademarks